(12) United States Patent
Morini et al.

(10) Patent No.: US 6,395,670 B1
(45) Date of Patent: May 28, 2002

(54) CATALYST COMPONENTS FOR THE POLMERIZATION OF OLEFINS

(75) Inventors: Giampiero Morini, Padua; Giulio Balbontin; Gianni Vitale, both of Ferrara, all of (IT)

(73) Assignee: Basell Technology Company BV, Hoofddorf (NL)

(*) Notice: Subject to any disclaimer, the term of this patent is extended or adjusted under 35 U.S.C. 154(b) by 0 days.

(21) Appl. No.: 09/306,532

(22) Filed: May 6, 1999

(30) Foreign Application Priority Data

May 6, 1998 (EP) .............................. 98201467

(51) Int. Cl.[7] .......................... B01J 31/00; B01J 37/00; C08F 4/02; C08F 4/60

(52) U.S. Cl. ...................... 502/140; 502/126; 502/125; 502/123; 502/132; 502/134; 526/124.3; 526/125.3; 526/125.6

(58) Field of Search .................. 502/126, 127; 526/124.3, 125.3, 125.6

(56) References Cited

U.S. PATENT DOCUMENTS

| | | | | |
|---|---|---|---|---|
| 4,220,554 A | | 9/1980 | Scatá et al. ................. | 252/429 |
| 4,298,718 A | | 11/1981 | Meyr et al. ................. | 526/125 |
| 4,399,054 A | | 8/1983 | Ferraris et al. ............. | 252/429 |
| 4,469,648 A | * | 9/1984 | Ferraris et al. ............. | 264/9 |
| 4,495,338 A | | 1/1985 | Mayr et al. ................. | 526/125 |
| 4,511,703 A | * | 4/1985 | Bailly ....................... | 502/126 |
| 4,634,687 A | * | 1/1987 | Fujita et al. ............... | 502/127 |
| 4,672,050 A | * | 6/1987 | Sasaki et al. ............... | 502/126 |
| 4,673,662 A | * | 6/1987 | Bailly ....................... | 502/126 |
| 4,686,200 A | * | 8/1987 | Terano et al. ............... | 502/127 |
| 4,971,937 A | * | 11/1990 | Albizzati et al. ............ | 502/126 |
| 4,978,648 A | * | 12/1990 | Barbe et al. ................ | 502/126 |
| 5,723,400 A | * | 3/1998 | Morini et al. ............... | 502/126 |
| 5,726,262 A | * | 3/1998 | Kioka et al. ................ | 502/126 |
| 6,048,818 A | * | 4/2000 | Morini et al. ............... | 502/103 |
| 6,331,501 B1 | * | 12/2001 | Satoh et al. ................ | 502/125 |

FOREIGN PATENT DOCUMENTS

| | | |
|---|---|---|
| EP | 0 395 083 A2 | 10/1990 |
| EP | 0 452 156 A2 | 10/1991 |
| EP | 0 553 805 A1 | 8/1993 |
| EP | 0 553 806 A1 | 8/1993 |
| EP | 0 585 869 A1 | 3/1994 |
| EP | 0 601 525 A1 | 6/1994 |
| EP | 0 728 770 A1 | 8/1996 |
| EP | 0 896 969 A1 | 2/1999 |

OTHER PUBLICATIONS

"Comprehensive Polymer Science: The Synthesis, Characterization, Reactions & Applications of Polymers", G. Allen, ed., vol. 4, pp. 1–25, 29–50, Pergamon Press, Oxford, 1989.*

Chûjo et al., "Two–site model analysis of $^{13}C$ n.m.r. of polypropylene polymerized by Ziegler–Natta catalyst with external alkoxysilane donors," *Polymer*, vol. 35, No. 2, pp. 339–342 (1994).

Inoue et al., "Studies of the stereospecific polymerization mechanism of propylene by a modified Ziegler–Natta catalyst based on 125 MHz $^{13}C$ n.m.r. spectra," *Polymer*, vol. 25 pp. 1640–1644 (Nov. 1984).

* cited by examiner

Primary Examiner—Mark L. Bell
Assistant Examiner—J. Pasterczyk
(74) Attorney, Agent, or Firm—Bryan Cave LLP

(57) ABSTRACT

The present invention relates to catalyst components for the polymerization of olefins having Mg, Ti, halogen and at least two internal electron donor compounds, said catalyst components characterized by the fact that at least one of the electron donor compounds is selected from ethers containing two or more ether groups which are further characterized by the formation of complexes with anhydrous magnesium dichloride in an amount less than 60 mmoles per 100 g of $MgCl_2$ and by the failure of entering into substitution reactions with $TiCl_4$ or by reacting in that way for less than 50% by moles, and at least another electron donor compound selected from esters of mono or polycarboxylic acids. Said catalyst components are able to produce propylene polymers which, for high values of xylene insolubility, show a broad range of isotacticity.

26 Claims, No Drawings

CATALYST COMPONENTS FOR THE POLMERIZATION OF OLEFINS

The present invention relates to catalyst components for the polymerization of olefins, in particular propylene, comprising a Mg dihalide based support on which are deposited a Ti compound having at least one Ti-halogen bond and at least two electron donor compounds selected from specific classes. The present invention further relates to the catalysts obtained from said components and to their use in processes for the polymerization of olefins. The catalysts of the present invention are able to give, with high yields, polymers characterized by high xylene insolubility, a broad range of isotacticity and are further characterized by a good balance between hydrogen response and isotacticity.

Catalyst components for the stereospecific polymerization of olefins are widely known in the art. Basically two types of catalyst systems are used in the normal processes for the (co)polymerization of olefins. The first one, in its broadest definition, comprises $TiCl_3$ based catalysts components, obtained for example by reduction of $TiCl_4$ with Al-alkyls, used in combination with Al-compounds such as diethylaluminum chloride (DEAC). Despite the good properties of the polymers in terms of isotacticity said catalysts are characterized by a very low activity which causes the presence of large amounts of catalytic residues in the polymers. As a consequence, a further step of deashing is necessary to obtain a polymer having a content of catalytic residue that makes it acceptable for wide use.

The second type of catalyst system comprises a solid catalyst component, constituted by a magnesium dihalide on which are supported a titanium compound and an internal electron donor compound, used in combination with an Al-alkyl compound. Conventionally however, when a higher crystallinity of the polymer is required, also an external donor (for example an alkoxysilane) is needed in order to obtain higher isotacticity. One of the preferred classes of internal donors is constituted by the esters of phthalic acid, diisobutylphthalate being the most used. This catalyst system is capable to give very good performances in terms of activity, isotacticity and xylene insolubility provided that an external electron donor compound is used. In its absence, low yields, low xylene insolubility and poor isotacticity are obtained. On the other hand, when the external donor is used, high xylene insolubility is obtained only together with a high isotacticity. This is not desirable in certain applications, such as production of bi-oriented polypropylene films (BOPP), where polypropylenes are required to have a lower flexural modulus (obtainable by lowering crystallinity of the polymer) while at the same time retaining a high xylene insolubility. As a consequence, it would be desirable to have a catalyst component with still improved characteristics, particularly in terms of activity and isotacticity, as well a catalyst component capable to give polymers coupling high xylene insolubility with a slight lower crystallinity suitable for making the polymers usable in the BOPP sector. Some improvements are obtained when, in the above mentioned catalyst system, the phthalates are substituted by the electron donor compounds disclosed for example in U.S. Pat. No. 4,971,937. In this case, the catalyst components obtained are capable to give better results when used in the absence of an external donor. In particular, the stereoregularity becomes acceptable, while however the xylene insolubility is still to be improved. Also in this case, when the catalyst component is used together with an external donor, high xylene insolubility isnobtaied only together with a high isotacticity.

It is therefore felt the need of a versatile catalyst component which, for high values of xylene insolubility, is capable to give polymers with a broader range of isotacticity. Moreover, it/would be also advantageous to have a catalyst component with still improved features in terms of activity and isotacticity.

It has now unexpectedly been found a catalyst component having the above advantages which comprises Mg, Ti, halogen and two electron donor compounds selected from specific classes.

It is therefore an object of the present invention a catalyst component for the polymerization of olefins $CH_2=CHR$, in which R is hydrogen or a hydrocarbyl radical with 1–12 carbon atoms, comprising Mg, Ti, halogen and at least two electron donor compounds, said catalyst component being characterized by the fact that at least one of the electron donor compounds is selected from ethers containing two or more ether groups which are/further characterized by the formation of complexes with anhydrous magnesium dichloride in an amount less than 60 mmoles per 100 g of $MgCl_2$ and by the failure of entering into substitution reactions with $TiCl_4$ or by reacting in that way for less than 50% by moles, and at least another electron donor compound is selected from esters of mono or polycarboxylic acids.

The conditions under which, the reactivity toward titanium tetrachloride and the complexing activity of the di or polyethers are tested, are reported below.

Very surprisingly it has been found that the performances of the above-disclosed catalysts are not merely intermediate between those of the catalyst components containing the single donors. While we do not intend being bound to any theoretical interpretation, it can be said that a synergic interaction between the elements of the catalyst component, and maybe in particular between the above mentioned donors, is the basis for explaining the unexpected properties of the catalyst component of the invention.

Among the di or polyethers mentioned above, particularly preferred are the compounds belonging to the class of the 1,3-diethers. In particular, preferred 1,3-diethers are those of formula (I)

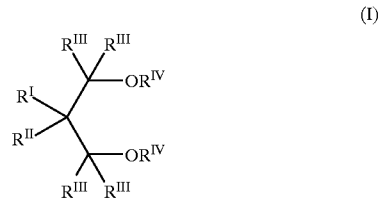

where $R^I$ and $R^{II}$ are the same or different and are hydrogen or linear or branched $C_1$–$C_{18}$ hydrocarbon groups which can also form one or more cyclic structures; $R^{III}$ groups, equal or different from each other, are hydrogen or $C_1$–$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1–6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethyihexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane,2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-di methoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohlexylmethyl-1,3-dimethoxypropane.

Furthermore, particularly preferred are the 1,3-diethers of formula (II)

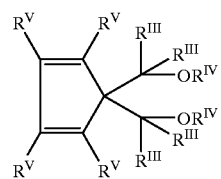

(II)

where the radicals $R^{IV}$ have the same meaning explained above and the radicals $R^{III}$ and $R^V$ radicals, equal or different to each other, are selected from the group consisting of hydrogen; halogens, preferably Cl and F; $C_1$–$C_{20}$ alkyl radicals, linear or branched; $C_3$–$C_{20}$ cycloalkyl, $C_6$–$C_{20}$ aryl, $C_7$–$C_{20}$ alkaryl and $C_7$–$C_{20}$ aralkyl radicals and two or more of the $R^V$ radicals can be bonded to each other to form condensed cyclic structures, saturated or unsaturated, optionally substituted with $R^{VI}$ radicals selected from the group consisting of halogens, preferably Cl and F; $C_1$–$C_{20}$ alkyl radicals, linear or branched; $C_1$–$C_{20}$ cycloalkyl, $C_6$–$C_{20}$ aryl, $C_7$–$C_{20}$ alkaryl and $C_7$–$C_{20}$ aralkyl radicals; said radicals $R^V$ and $R^{VI}$ optionally containing one or more heteroatoms as substitutes for carbon or hydrogen atoms, or both. Preferably, in the 1,3-diethers of formulae (I) and (II) all the $R^{III}$ radicals are hydrogen, and all the $R^{IV}$ radicals are methyl. Moreover, are particularly preferred the 1,3-diethers of formula (II) in which two or more of the $R^V$ radicals are bonded to each other to form one or more condensed cyclic structures, preferably benzenic, optionally substituted by $R^{VI}$ radicals. Specially preferred are the compounds of formula (III):

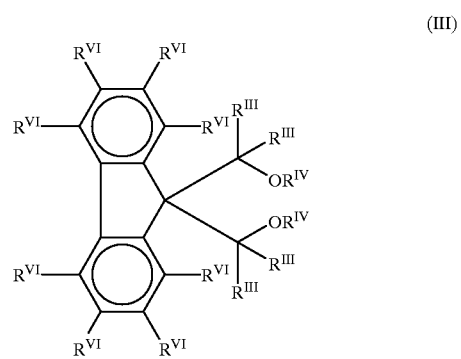

(III)

where the $R^{VI}$ radicals equal or different are hydrogen; halogens, preferably Cl and F; $C_1$–$C_{20}$ alkyl radicals, linear or branched; $C_3$–$C_{20}$ cycloalkyl, $C_6$–$C_{20}$ aryl, $C_7$–$C_{20}$ alkylaryl and $C_7$–$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ and $R^{IV}$ are as defined above for formula (II).

Specific examples of compounds comprised in formulae (II) and (III) are:

1,1-bis(methoxymethyl)-cyclopentadiene;

1,1-bis(methoxymethyl)-2,3,4,5-tetramethylcyclopentadiene;

1,1-bis(methoxymethyl)-2,3,4,5-tetraphenylcyclopentadiene;

1,1-bis(methoxymethyl)-2,3,4,5-tetrafluorocyclopentadiene;

1,1-bis(methoxymethyl)-3,4-dicyclopentylcyclopentadiene;

1,1-bis(methoxymethyl)indene; 1,1-bis(methoxymethyl)-2,3-dimethylindene;

1,1-bis(imethoxymethyl)-4,5,6,7-tetrahydroindene;

1,1-bis(methoxymethyl)-2,3,6,7-tetrafluoroindene;

1,1-bis(methoxymethyl)-4,7-dimethylindene;

1,1-bis(methoxymethyl)-3,6-dimethylindene;

1,1-bis(methoxymethyl)-4-phenylindene;

1,1-bis(methoxymethyl)-4-phenyl-2-methylindene;

1,1-bis(methoxymethyl)-4-cyclohexylindene;

1,1-bis(methoxymethyl)-7-(3,3,3-trifluoropropyl)indene;

1,1-bis(methoxymethyl)-7-trimethyisilylindene;

1,1-bis(methoxymethyl)-7-trifluoromethylindene;

1,1-bis(methoxymethyl)-4,7-dimethyl-4,5,6,7-tetrahydroindene;

1,1-bis(methoxymethyl)-7-methylindene;

1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

As explained above, the other electron donor compound which must be present in the catalyst component of the invention has to be selected from the esters of mono or polycarboxylic acids. Said acids can be both aliphatic and aromatic acids.

Among esters of aliphatic acids, particularly preferred are the esters of bicarboxylic acids in particular esters of malonic acids. Particularly preferred are the esters of malonic acids of formula (IV):

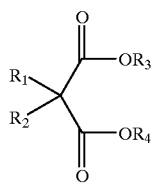

(IV)

where $R_1$ is H or a $C_1$–$C_{20}$ linear or branched alkyl, alkenyl, cycloalkyl, aryl, arylalkyl or alkylaryl group, $R_2$ is a $C_1$–$C_{20}$ linear or branched alkyl, alkenyl, cycloalkyl, aryl, arylalkyl or alkylaryl group, $R_3$ and $R_4$, equal to, or different from, each other, are $C_1$–$C_{20}$ linear or branched alkyl groups or $C_3$–$C_{20}$ cycloalkyl groups.

Preferably, $R_3$ and $R_4$ are primary, linear or branched $C_1$–$C_{20}$ alkyl groups, more preferably they are primary branched $C_4$–$C_{20}$ alkyl groups such as isobutyl or neopentyl groups. $R_2$ is preferably, in particular when $R_1$ is H, a linear or branched $C_3$–$C_{20}$ alkyl, cycloalkyl, or arylalkyl group; more preferably $R_2$ is a $C_3$–$C_{20}$ secondary alkyl, cycloalkyl, or arylalkyl group.

Specific examples of preferred monosubstituted malonate compounds are: dineopentyl 2-isopropylmalonate, diisobutyl 2-isopropylmalonate, di-n-butyl 2-isopropylmalonate, diethyl 2-dodecylmalonate, diethyl 2-t-butylmalonate, diethyl 2-(2-pentyl)malonate, diethyl 2-cyclohexylmalonate, dineopentyl 2-t-butylmalonate, dineopentyl 2-isobutylmalonate, diethyl 2-cyclohexylmethylmalonate, dimethyl 2-cyclohexylmethylmalonate.

Specific examples of preferred disubstituted malonates compounds are: diethyl 2,2-dibenzylmalonate, diethyl 2-isobutyl-2-cyclohexylmalonate, dimethyl 2-n-butyl-2-isobutylmalonate, diethyl 2-n-butyl-2-isobutylmalonate, diethyl 2-isopropyl-2-n-butylmalonate, diethyl 2-methyl-2-isopropylmalonate, diethyl 2-isopropyl-2-isobutylmalonate, diethyl 2-methyl-2-isobutylmalonate, diethyl 2-isobutyl-2-benzylmalonate.

Preferred esters of aromatic carboxylic acids are selected from $C_1$–$C_{20}$ alkyl or aryl esters of benzoic and phthalic acids, possibly substituted. The alkyl esters of the said acids being preferred. Particularly preferred are the $C_1$–$C_6$ linear or branched alkyl esters. Specific examples are ethylbenzoate, n-butylbenzoate, p-methoxy ethylbenzoate, p-ethoxy ethylbenzoate, isobutylbenzoate, ethyl p-toluate, diethyl phthalate, di-n-propyl phthalate, di-n-butyl phthalate di-n-pentyl phthalate, di-i-pentyl phthalate, bis(2-ethylhexyl) phthalate, ethyl-isobutyl phthalate, ethyl-n-butyl phthalate, di-n-hexyl phthalate, di-isobutylphthalate.

As explained above, the catalyst components of the invention comprise, in addition to the above electron donors, Ti, Mg and halogen. In particular, the catalyst components comprise a titanium compound, having at least a Ti-halogen bond and the above mentioned electron donor compounds supported on a Mg halide. The magnesium halide is preferably $MgCl_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$ can be used, where n is the valence of titanium, y is a number between 1 and n–1 X is halogen and R is a hydrocarbon radical having from 1 to 10 carbon atoms.

The preparation of the solid catalyst component can be carried out according to several methods. According to one of these methods, the magnesium dichloride in an anhydrous state, the titanium compound and the electron donor compounds are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the electron donor compounds are treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of $TiCl_4$ at a temperature of about 80 to 135° C. in the presence of the electron donor compounds. The treatment with $TiCl_4$ is repeated and the solid is washed with hexane in order to eliminate any non-reacted TiCl$_4$. A further method comprises the reaction between magnesium alcoholates or chloroalcoholates (in particular chloroalcoholates prepared according to U.S. Pat. No. 4,220,554) and an excess of TiCl$_4$ in the presence of the electron donor compounds at a temperature of about 80 to 120° C.

According to a preferred method, the solid catalyst component can be prepared by reacting a titanium compound of formula Ti(OR)$_{n-y}$X$_y$, where n is the valence of titanium and y is a number between 1 and n, preferably TiCl$_4$, with a magnesium chloride deriving from an adduct of formula MgCl$_2$pROH, where p is a number between 0.1 and 6, preferably from 2 to 3.5, and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with Ti compound or it can be previously subjected to thermal controlled dealcoholation (80–130° C.) so as to obtain an adduct in which the number of moles of alcoholis generally lower than 3 preferably between 0.1 and 2.5. The reaction with the Ti compound can be carried out by suspending the adduct (dealcoholated or as such) in cold TiCl$_4$ (generally 0° C.); the mixture is heated up to 80–130° C. and kept at this temperature for 0.5–2 hours. The treatment with TiCl$_4$ can be carried out one or more times. The electron donor compounds can be added during the treatment with TiCl$_4$. They can be added together in the same treatment with TiCl$_4$ or separately in two or more treatments. The preparation of catalyst components in spherical form are described for example in European Patent Applications EP-A-395083, EP-A-553805, EP-A-553806, EPA601525 and WO98/44001.

The solid catalyst components obtained according to the above method show a surface area (by B.E.T. method) generally between 20 and 500 m$^2$/g and preferably between 50 and 400 m$^2$/g and a total porosity (by B.E.T. method) higher than 0.2 cm$^3$/g preferably between 0.2 and 0.6 cm$^3$/g. The porosity (Hg method) due to pores with radius up to 10.000 Å generally ranges from 0.3 to 1.5 cm$^3$/g, preferably from 0.45 to 1 cm$^3$/g.

A further method to prepare the solid catalyst component of the invention comprises halogenating magnesium dihydrocarbyloxide compounds, such as magnesium dialkoxide or diaryloxide, with solution of TiCl$_4$ in aromatic hydrocarbon (such as toluene, xylene etc.) at temperatures between 80 and 130° C. The treatment with TiCl$_4$ in aromatic hydrocarbon solution can be repeated one or more times, and the electron donor compounds are added during one or more of these treatments.

In any of these preparation methods the desired electron donor compounds and in particular those selected from esters of carboxylic acids, can be added as such or, in an alternative way, it can be obtained in situ by using an appropriate precursor capable to be transformed in the desired electron donor compound by means, for example, of known chemical reactions such as esterification, transesterification, etc.

Regardless to the preparation method used, the final amount of the two or more electron donor compounds is such that the molar ratio with respect to the MgCl$_2$ is from 0.01 to 1, preferably from 0.05 to 0.5, while the molar ratio between the di or polyether donor and the esteddonor is comprised in the range of from 50 to 0.02 preferably from 30 to 0.1 and more preferably from 20 to 0.2.

The solid catalyst components according to the present invention are converted into catalysts for the polymerization of olefins by reacting them with organoaluminum compounds according to known methods.

In particular, it is an object of the present invention a catalyst for the polymerization of olefins CH$_2$=CHR, in which R is hydrogen or a hydrocarbyl radical with 1–12 carbon atoms, comprising the product of the reaction between:

(i) the solid catalyst component as disclosed above and
(ii) an alkylaluminum compound.

The alkyl-Al compound (ii) is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides, such as AlEt$_2$Cl and Al$_2$Et$_3$Cl$_3$, possibly in mixture with the above cited trialkylaluminums.

As explained above, the catalyst component of the invention when used in the polymerization of propylene in the absence of external donors are able to give polymers with a controlled wide range of isotacticity (expressed in term of percentage of mmmm pentads) while maintaining high xylene insolubility levels.

Furthermore, the catalyst components of the invention can also be used in combination with an external donor (iii) thereby obtaining very high values of both xylene insolubility and isotacticity. In particular, said values, individually or as a balance, are higher than the values obtainable with the catalyst containing the single donors.

Suitable external electron-donor compounds include silicon compounds, ethers, esters, amines, heterocyclic compounds and particularly 2,2,6,6-tetramethyl piperidine, ketones and the 1,3-diethers of the general formula (V):

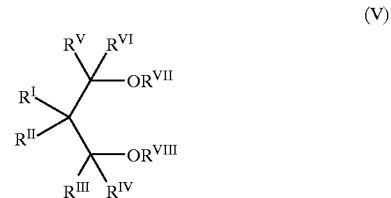

(V)

wherein R$^I$, R$^{II}$, R$^{III}$, R$^{IV}$, R$^V$ and R$^{VI}$ equal or different to each other, are hydrogen or hydrocarbon radicals having from 1 to 18 carbon atoms, and R$^{VII}$ and R$^{VIII}$, equal or different from each other, have the same meaning of R$^I$–R$^{VI}$ except that they cannot be hydrogen; one or more of the R$^I$–R$^{VIII}$ groups can be linked to form a cycle. Particularly preferred are the 1,3-diethers in which R$^{VII}$ and R$^{VIII}$ are selected from C$_1$–C$_4$ alkyl radicals.

Another class of preferred external donor compounds is that of silicon compounds of formula R$_a^5$R$_b^6$Si(OR$^7$)$_c$, where a and b are integers from 0 to 2, c is an integer from 1 to 3 and the sum (a+b+c) is 4; R$^5$, R$^6$, and R$^7$, are alkyl, cycloalkyl or aryl radicals with 1–18 carbon atoms optionally containing heteroatoms. Particularly preferred are the silicon compounds in Which a is 1, b is 1, c is 2, at least one of R$^5$ and R$^6$ is selected from branched alkyl, cycloalkyl or aryl groups with 3–10 carbon atoms optionally containing heteroatoms and R$^7$ is a C$_1$–C$_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane, (2-ethylpiperidinyl)t-butyldimethoxysilane, (2-ethylpiperidinyl) thexyldimethoxysilane, (3,3,3-trifluoro-n-propyl)(2-ethylpiperidinyl)dimethoxysilane, methyl(3,3,3-trifluoro-n-propyl)dimethoxysilane. Moreover, are also preferred the silicon compounds in which a is 0, c is 3, $R^6$ is abranched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane.

The electron donor compound (iii) is used in such an amount to give a molar ratio between the organoaluminum compound and said electron donor compound (iii) of from 0.1 to 500, preferably from 1 to 300 and more preferably from 3 to 100.

Therefore, it constitutes a further object of the present invention a process for the (co)polymerization of olefins $CH_2=CHR$, in which R is hydrogen or a hydrocarbyl radical with 1–12 carbon atoms, carried out in the presence of a catalyst comprising the product of the reaction between:

(i) a solid catalyst component comprising a titanium compound, having at least a Ti-halogen bond, and at least two electron donor compounds supported on a Mg halide said catalyst being characterized by the fact that at least one of the electron donors compounds is selected from ethers containing two or more ether groups which are further characterized by the formation of complexes with anhydrous magnesium dichloride in an amount less than 60 mmoles per 100 g of $MgCl_2$ and by the failure of entering into substitution reactions with $TiCl_4$ or by reacting in that way for less than 50% by moles, and at least another electron donor compound is selected from esters of mono or polycarboxylic acids;

(ii) an alkylaluminum compound and, (iii) optionally an electron-donor compound (external donor).

The polymerization process can be carried out according to known techniques for example slurry polymerization using as diluent an inert hydrocarbon solvent, or bulk polymerization using the liquid monomer (for example propylene) as a reaction medium. Moreover, it is possible to carry out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 5 MPa, preferably between 1 and 4 MPa. In the bulk polymerization the operating pressure is generally between 1 and 8 MPa preferably between 1.5 and 5 MPa.

The following examples are given in order to better illustrate the invention without limiting it.

CHARACTERIZATIONS

Complexing Test of the Ethers with $MgCl_2$

In a 100 ml glass flask with fixed blades mechanical stirrer are introduced under nitrogen atmosphere in order:

70 ml of anhydrous n-heptane 12 mmoles of anhydrous $MgCl_2$ activated as described below 2 mmoles of ether.

The content is allowed to react at 60° C. for 4 hours (stirring speed at 400 rpm). It is then filtered and washed at ambient temperature with 100 ml of n-heptane after which it is dried with a mechanical pump.

The solid is characterized, after having been treated with 100 ml of ethanol, by way of a gaschromatographic quantitative analysis for the analysis of the quantity of ether fixed. The magnesium chloride used in the complexing test with the ethers is prepared as follows.

In a 1 liter vibrating mill jar (Vibratom from Siebtechnik) containing 1.8 Kg of steel spheres 16 mm in diameter, are introduced under nitrogen atmosphere, 50 g of anhydrous $MgCl_2$ and 6.8 ml of 1,2-dichloroethane (DCE).

The content is milled at room temperature for 96 hours, after which the solid recovered is kept under vacuum in the mechanical pump for 16 hours at 50° C.

Characterization of the solid:

Presence of a halo with maximum intensity at $2\theta=32.1°$.

Surface area (B.E.T)=125 $m^2/g$ residual DCE=2.5% by weight.

Test of the Reation With TiCl4

In a 25 ml test-tube with a magnetic stirrer and under nitrogen atmosphere are introduced: 10 ml of anhydrous n-heptane, 5 mmoles of $TiCl_4$ and 1 mmole of donor. The content is allowed to react at 70° C. for 30 minutes, after which it is cooled to 25° C. and decomposed with 90 ml of ethanol.

The solutions obtained are analyzed by gaschromatography.

Polymer Microstructure Analysis 50 mg of each xylene insoluble fraction were dissolved in 0.5 ml of $C_2D_2Cl_4$.

The $^{13}C$ NMR spectra were acquired on a Bruker DPX-400 (100.61 Mhz, 90° pulse, 12s delay between pulses). About 3000 transients were stored for each spectrum; mmmm pentad peak (21.8 ppm) was used as reference.

The microstructure analysis was carried out as described in literature (*Polymer*, 1984, 25, 1640, by Inove Y. et Al. and *Polymer*, 1994, 35, 339, by Chujo R. et Al.).

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference, the X.I. %.

EXAMPLES

Examples 1–7 and Comparative Examples C1–C4

Preparation of Solid Catalyst Components

Into a 1000 ml five-necked flask, purged with nitrogen, 800 ml of $TiCl_4$ were introduced at 0° C. While stirring, 40.0 g of microspheroidal $MgCl_2*2.1C_2H_5OH$ (obtained by par tial Thermal dealcoholation of an adduct prepared as described in ex. 2 of U.S. Pat. No. 4,399,054 but operating at 3,000 rpm instead of 10,000) were introduced. As internal donor(s), a mixture of diether+ester or a diether or an ester were also added. Type(s) of internal donor(s) and amount(s) are reported in Table 1.

The temperature was raised to 110° C. and kept for 60 min. Then, the stirring was discontinued, the solid product was allowed to settle and the supernatant liquid was siphoned off.

800 ml of fresh $TiCl_4$ and a mixture of diether+ ester or a diether or an ester, type(s) and amount(s) are reported in Table 1, were added and reacted under stirring at 110° C. for 30 min; then, the supernatant liquid was siphoned off.

800 ml of fresh $TiCl_4$ were added, the mixture was maintained under agitation at 110° C. for 30 min. and then the supernatant liquid was siphoned off. The solid was washed five times (5×300 ml) at 60° C. and three times (3×300 ml) at room temperature with anhydrous hexane. The solid was finally dried under vacuum and analyzed. The amount of Ti, internal donors and Diether/Ester molar ratio in the solid catalyst component are reported in Table 1.

Polymerization Examples 8–12 and Comparative Examples C5–C6

Polymerization of propylene by using solid catalyst components of examples 1–4, 7 and C1–C2.

In a 4 liter autoclave, purged with nitrogen flow at 70° C. for one our, 75 ml of anhydrous hexane containing 600 mg of $AlEt_3$ and 6 mg of solid catalyst component were introduced in propylene flow at 30° C. The autoclave was closed, 1.0 Nl of hydrogen was added and then, under stirring, 1,2 Kg of liquid propylene were fed. The temperature was raised to 70° C. in five minutes and the polymerization was carried out at this temperature for two hours. The nonreacted propylene was removed, the polymer was recovered and dried at 70° C. under vacuum for three hours, and then weighed and fractionated with o-xylene to determine the amount of the xylene insoluble (X.I.) fraction. The xylene insoluble fraction was further characterized with $^{13}$C-NMR to determine the value of mmmm%. The results are reported in Table 2.

Comparative Example C7

By using the solid catalyst component of the comparative example C2, propylene was polymerized using the procedure described in examples 8–12 and C5–C6, but, in this case, as external donor 0.0026 mmoles of 9,9-bis(methoxymethyl)fluorene were added. The results are reported in Table 2

Polymerization Examples 13–19 and Comparative Examples C8–C11

By using the solid catalyst components of examples 1–7 and C1–C4, propylene was polymerized using the procedure described in the examples 8–12 and C5–C6, but, in this case as external donor 0.27 mmoles of Dicyclopentyldimethoxysilane were added and 1.5 Nl of hydrogen were used. The results are reported in Table 2

Examples 20–21 and Comparative Examples C12–C13

Preparation of Solid Catalyst Components

Into a 1000 ml five-necked flask, purged with nitrogen, 800 ml of $TiCl_4$ were introduced at 0° C. While stirring, 32.0 g of microspheroidal $MgCl_2*2.8C_2H_5OH$ (prepared according the method described in as described. ex. 2 of U.S. Pat. No. 4,399,054 but operating at 3,000 rpm instead of 10,000) were introduced. As internal donor(s), a mixture of diether+ester or a diether or an ester were also added. Type(s) of internal donor(s) and amount(s) are reported in Table 3

The temperature was raised to 110° C. and maintained for 60 min. Then, the stirring was discontinued, the solid product was allowed to settle and the supernatant liquid was siphoned off.

800 ml of fresh $TiCl_4$ and a mixture of diether+ ester or a diether or an ester, type(s) and amount(s) are reported in Table 1, were added and reacted under stirring at 110° C. for 30 min; then, the supernatant liquid was siphoned off.

800 ml of fresh $TiCl_4$ were added, the mixture was maintained under agitation at 110° C. for 30 min. and then the supernatant liquid was siphoned off. The solid was washed five times (5×300 ml) at 60° C. and three times (3×300 ml) at room temperature with anhydrous hexane. The solid was finally dried under vacuum and analyzed. The amount of Ti, I.D.'s and Diether/Ester molar ratio in the solid catalyst component are reported in

Examples 22–23 and Comparative Examples C14–C15

By using the solid catalyst components of examples 20–21 and C12–C13, polymerizations were carried out with the same procedure described in the examples 8–12 and C5–C6. The result are reported in Table 4

Examples 24–25 and Comparative Examples C16–C17

By using the solid catalyst components of examples 20–21 and C12–C13, propylene was polymerized with the same procedure described in the examples 13–19 and C8–C11. The results are reported in Table 4

Examples 26–27 and Comparative Examples C18–C19

Polymerizations were conducted by using the solid catalyst components of examples 20–21 and C12–C13.

In a 4 liter autoclave, purged with nitrogen flow at 70° C. for one our, 75 ml of anhydrous hexane containing 830 mg of $AlEt_3$, 330 mg of $AlEt_2Cl$, 560 mg of ethyl-p-ethoxybenzoate and 6 mg of solid catalyst component were introduced in propylene flow at 30° C. The autoclave was closed, 1.5 Nl of hydrogen were added and then, under stirring, 1,2 Kg of liquid propylene were fed. The temperature was raised to 70° C. in five minutes and the polymerization was carried out at this temperature for two hours. The nonreacted propylene was removed, the polymer was recovered and dried at 70° C. under vacuum for three hours, and then weighed and fractionated with o-xylene to determine the amount of the xylene insoluble fraction (X.I.). The xylene insoluble fraction was further characterized with $^{13}$C-NMR to determine the value of mmmm%. The results are reported in Table 4.

TABLE 1

| | PREPARATION CONDITIONS | | | | | | | | | | | |
|---|---|---|---|---|---|---|---|---|---|---|---|---|
| | $I^{st}$ Titanation | | | | $II^{nd}$ Titanation | | | | COMPOSITION | | | |
| Example N° | Diether type | mmols | Ester type | mmols | Diether type | mmols | Ester type | mmols | Ti wt % | Diether wt % | Ester wt % | Diether/Ester m.r. |
| 1 | A | 26.1 | DIBP | 2.1 | A | 26.1 | DIBP | 2.1 | 4.2 | 13.7 | 1.1 | 13.6 |
| 2 | " | 23.2 | " | 8.7 | " | 11.6 | " | 4.4 | 3.7 | 15.3 | 5.3 | 3.2 |
| 3 | " | 23.2 | " | 17.4 | " | 11.6 | " | 8.7 | 3.7 | 7.6 | 7.6 | 1.1 |
| 4 | " | 17.4 | " | 26.1 | " | 8.7 | " | 13.1 | 4.6 | 9.3 | 13.7 | 0.7 |
| 5 | " | 2.6 | " | 17.4 | " | 2.6 | " | 8.7 | 3.1 | 2.6 | 10.7 | 0.3 |
| 6 | B | 23.2 | DIBP | 17.4 | B | 11.6 | DIBP | 8.7 | 4.5 | 7.6 | 7.2 | 1.5 |
| 7 | A | 23.2 | DTBM | 17.4 | A | 11.6 | DTBM | 8.7 | 3.9 | 12.0 | 10.4 | 1.0 |
| C1 | A | 23.2 | — | — | A | 11.6 | — | — | 5.5 | 13.9 | — | — |
| C2 | — | — | DIBP | 17.4 | — | — | DIBP | 8.7 | 2.8 | — | 8.8 | — |
| C3 | B | 23.2 | — | — | B | 11.6 | — | — | 3.8 | 11.8 | — | — |
| C4 | — | — | DTBM | 23.2 | — | — | DTBM | 11.6 | 3.3 | — | 12.1 | — |

A = 9,9-bis(methoxymethyl)fluorene
B = 2-isobutyl-2-isopropyl-1,3-dimethoxypropane
DIBP = diisobutylphthalate
DTBM = Diethyl-2-tertbutylmalonate

TABLE 2

| Polymerization Example. n. | Catalyst Ex. n. | Yield Kg/g | X.I. % | mmmm % |
|---|---|---|---|---|
| 8 | 1 | 118 | 97.2 | 97.6 |
| 9 | 2 | 96 | 96.6 | 96.6 |
| 10 | 3 | 54 | 97.0 | 96.4 |
| 11 | 4 | 57 | 95.6 | 96.1 |
| 12 | 7 | 60 | 97.2 | 97.1 |
| C.5 | C.1 | 90 | 95.3 | 96.1 |
| C.6 | C.2 | 24 | 63.0 | 82.9 |
| C.7 | C.2 | 38 | 82.6 | 92.5 |
| 13 | 1 | 86 | 98.8 | 98.4 |
| 14 | 2 | 70 | 98.8 | 98.1 |
| 15 | 3 | 52 | 98.6 | 98.7 |
| 16 | 4 | 57 | 98.2 | 98.3 |
| 17 | 5 | 52 | 98.8 | 97.8 |
| 18 | 6 | 38 | 98.8 | 97.7 |
| 19 | 7 | 51 | 99.0 | 98.3 |
| C.8 | C.1 | 70 | 98.4 | 97.7 |
| C.9 | C.2 | 50 | 98.0 | 98.9 |
| C.10 | C.3 | 40 | 98.5 | n.d. |
| C.11 | C.4 | 27 | 97.0 | 97.3 |

TABLE 3

| | PREPARATION CONDITIONS | | | | | | | | | | | |
|---|---|---|---|---|---|---|---|---|---|---|---|---|
| | $I^{st}$ Titanation | | | | $II^{nd}$ Titanation | | | | COMPOSITION | | | |
| Example N° | Diether type | mmols | Ester type | mmols | Diether type | mmols | Ester type | mmols | Ti wt % | Diether wt % | Ester wt % | Diether/Ester m.r. |
| 20 | A | 15.9 | EB | 35.8 | A | 7.9 | EB | 15.9 | 3 | 22.4 | 4.0 | 3.3 |
| 21 | " | 15.9 | " | 95.3 | " | 7.9 | — | — | 3.7 | 10.7 | 7.0 | 0.9 |
| C12 | " | 15.9 | — | — | " | 7.9 | — | — | 5.2 | 17.7 | — | — |
| C13 | — | — | EB | 95.3 | — | — | — | — | 3.9 | — | 15.7 | — |

EB = ethylbenzoate

TABLE 4

| Polymerization Example. n. | Catalyst Ex. n. | Yield Kg/g | X.I. % | mmmm % |
|---|---|---|---|---|
| 22 | 20 | 130 | 97.1 | 96.5 |
| 23 | 21 | 121 | 96.5 | 95.9 |
| C14 | C12 | 130 | 95.1 | 96.2 |
| C15 | C13 | 58 | 41.5 | 80.3 |
| 24 | 20 | 95 | 99 | 98.3 |
| 25 | 21 | 94 | 98.8 | 97.9 |
| C16 | C12 | 100 | 98.2 | 97.7 |
| C17 | C13 | 51 | 91.2 | n.d. |
| 26 | 20 | 41 | 99.3 | 98.2 |
| 27 | 21 | 64 | 98.8 | 98.1 |
| C18 | C12 | 39 | 98.5 | n.d. |
| C19 | C13 | 25 | 95.5 | 95.5 |

What is claimed is:

1. In a catalyst component for the polymerization of olefins $CH_2$=CHR, in which R is hydrogen or a hydrocarbyl radical with 1–12 carbon atoms, comprising Mg, Ti, and halogen, the improvement comprising:

in the catalyst component, the presence of at least two internal electron donor compounds, a first internal electron donor compound selected from the group consisting of ethers containing two or more ether groups, wherein said ethers are further characterized by the formation of complexes with anhydrous magnesium dichloride in an amount less than 60 mmoles per 100 g of MgCl$_2$ and by the failure of entering into substitution reactions with TiCl$_4$ or by reacting in that way for less than 50% by moles, and a second internal electron donor compound selected from the group consisting of esters of mono and polycarboxylic acids.

2. A catalyst component according to claim 1 in which the first internal electron donor compound is an ether selected from the group consisting of 1,3-diethers.

3. A catalyst component according to claim 2 in which the 1,3-diethers are of formula (I)

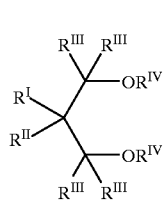

(I)

where $R^I$ and $R^{II}$ are the same or different and are hydrogen or linear or branched C$_1$–C$_{18}$ hydrocarbon groups which can also form one or more cyclic structures; $R^{III}$ groups, equal or different from each other, are hydrogen or C$_1$–C$_{18}$ hydrocarbon groups; $R^{IV}$ groups, equal or different from each other, have the same meaning of $R^{III}$ except that they cannot be hydrogen; each of $R^I$ to $R^{IV}$ groups can contain heteroatoms selected from the group consisting of halogens, N, O, S and Si.

4. A catalyst component according to claim 3 in which the 1,3-diethers are of formula (II)

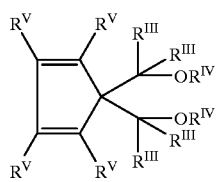

(II)

where the radicals $R^{IV}$ have the same meaning explained in claim 3 above, and the radicals $R^{III}$ and $R^V$ radicals, equal or different, are selected from the group consisting of hydrogen, halogens, C$_1$–C$_{20}$ alkyl radicals, linear or branched; C$_3$–C$_{20}$ cycloalkyl, C$_6$–C$_{20}$ aryl, C$_7$–C$_{20}$ alkaryl and C$_7$–C$_{20}$ aralkyl radicals, and two or more of the $R^V$ radicals can be bonded to each other to form condensed cyclic structures, saturated or unsaturated, optionally substituted with $R^{VI}$ radicals selected from the group consisting of halogens, C$_1$–C$_{20}$ alkyl radicals, linear or branched; C$_3$–C$_{20}$ cycloalkyl, C$_6$–C$_{20}$ aryl, C$_7$–C$_{20}$ alkaryl and C$_7$–C$_{20}$ aralkyl radicals; said radicals $R^V$ and $R^{VI}$ optionally containing one or more heteroatoms as substitutes for carbon or hydrogen atoms, or both.

5. A catalyst component according to claim 3 in which the $R^{III}$ radicals are hydrogen, and all the $R^{IV}$ radicals are methyl.

6. A catalyst component according to claim 4 in which two or more of the $R^V$ radicals are bonded to each other to form one or more condensed cyclic structures.

7. A catalyst component according to claim 6 in which the 1,3-diethers are selected from the compounds of formula (III):

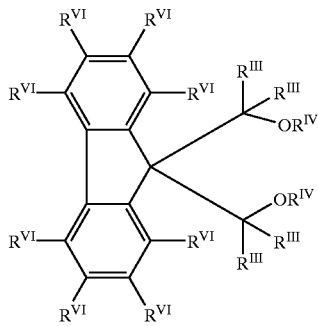

(III)

where the $R^{VI}$ radicals, equal or different, are hydrogen; halogens; C$_1$–C$_{20}$ alkyl radicals, linear or branched; C$_3$–C$_{20}$ cycloalkyl, C$_6$–C$_{20}$ aryl, C$_7$–C$_{20}$ alkylaryl and C$_7$–C$_{20}$ aralkyl radicals, optionally containing one or more heteroatoms selected from the group consisting of N, O, S, P, Si and halogens, as substitutes for carbon or hydrogen atoms, or both, and the radicals $R^{III}$ and $R^{IV}$ are as defined in claim 4 above for formula (II).

8. A catalyst component according to claim 1 in which the second internal electron donor compound is an ester of aliphatic dicarboxylic acids.

9. A catalyst component according to claim 8 in which the second internal electron donor is an ester of malonic acids of formula (IV):

$$\begin{array}{c}\text{(IV)}\\[2pt]\underset{R_2}{\overset{R_1}{\diagdown}}\hspace{-4pt}\underset{\|}{\overset{\|}{C}}\hspace{-4pt}\begin{array}{c}\text{—OR}_3\\ \text{—OR}_4\end{array}\end{array}$$

where R$_1$ is H or a C$_1$–C$_{20}$ linear or branched alkyl, alkenyl, cycloalkyl, aryl, arylalkyl or alkylaryl group, R$_2$ is a C$_1$–C$_{20}$ linear or branched alkyl, alkenyl, cycloalkyl, aryl, arylalkyl or alkylaryl group, R$_3$ and R$_4$, equal to or different from each other, are C$_1$–C$_{20}$ linear or branched alkyl groups or C$_3$–C$_{20}$ cycloalkyl groups.

10. A catalyst component according to claim 1 in which the second internal electron donor compound is an ester of an aromatic carboxylic acid.

11. A catalyst component according to claim 10 in which the ester of the aromatic carboxylic acid is C$_1$–C$_{20}$ alkyl or aryl esters of benzoic or phthalic acid, optionally substituted.

12. A catalyst component according to claim 1 in which the second internal electron donor compound is a C$_1$–C$_6$ linear or branched alkyl ester.

13. A catalyst component according to claim 1 in which the molar ratio between the first internal electron donor compound and the second internal electron donor compound is in the range of from 0.02 to 50.

14. A catalyst component according to claim 1 in which the molar ratio between the first internal electron donor compound and the second internal electron donor compound is from 0.1 to 30.

15. A catalyst component according to claim 14 comprising a titanium compound having at least a Ti-halogen bond and the at least two internal electron donor compounds supported on a Mg halide in active form.

16. A catalyst component according to claim 15 in which the titanium compound is TiCl$_4$ or TiCl$_3$.

17. A catalyst component according to claim 1 having a spherical form, a surface area (by B.E.T. method) between 20 and 500 m²/g, and a total porosity (by B.E.T. method) higher than 0.2 cm³/g.

18. A catalyst for the polymerization of olefins $CH_2=CHR$, in which R is hydrogen or a hydrocarbyl radical with 1–12 carbon atoms, comprising the product of the reaction between:
(i) the catalyst component according to claim 1 and
(ii) an alkylaluminum compound.

19. A catalyst according to claim 18 further comprising an external electron donor compound.

20. A catalyst according to claim 19 in which the external electron donor compound is selected from the group consisting of ethers, esters, amines, heterocyclic compounds, 2,2,6,6-tetramethyl piperidine, ketones and 1,3-diethers of the general formula (V):

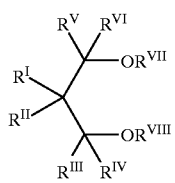

(V)

wherein $R^I$, $R^{II}$, $R^{III}$, $R^{IV}$, $R^V$ and $R^{VI}$, equal to or different from each other, are hydrogen or hydrocarbon radicals having from 1 to 18 carbon atoms, and $R^{VII}$ and $R^{VIII}$, equal to or different from each other, have the same meaning of $R^I$–$R^{VI}$ except that they cannot be hydrogen, wherein one or more of the $R^I$–$R^{VIII}$ groups can be linked to form a cycle.

21. A catalyst according to claim 19 in which the external electron donor compound is selected from silicon compounds of formula $R_a^5 R_b^6 Si(OR^7)_c$, where a and b are integers from 0 to 2, c is an integer from 1 to 4 and the sum (a+b+c) is 4; $R^5$, $R^6$ and $R^7$ are alkyl, cycloalkyl or aryl radicals with 1–18 carbon atoms optionally containing heteroatoms.

22. A catalyst according to claim 21 in which a is 1, b is 1, and c is 2.

23. Catalyst according to claim 22 in which $R^5$ or $R^6$, or both, are branched alkyl, cycloalkyl or aryl groups with 3–10 carbon atoms optionally containing heteroatoms, and $R^7$ is a $C_1$–$C_{10}$ alkyl group.

24. A catalyst according to claim 21 in which a is 0, c is 3, $R^6$ is a branched alkyl or cycloalkyl group, and $R^7$ is methyl.

25. A catalyst according to claim 22 in which the silicon compound is selected from the group consisting of methylcyclohexyldimethoxysilane, diphenyldimethoxysilane, methyl-t-butyldimethoxysilane, dicyclopentyldimethoxysilane, (2-ethylpiperidinyl)t-butyldimethoxysilane, (2-ethylpiperidinyl)hexyldimethoxysilane, (3,3,3-trifluoro-n-propyl)(2-ethylpiperidinyl)dimethoxysilane, and methyl(3,3,3-trifluoro-n-propyl)dimethoxysilane.

26. Process for the (co)polymerization of olefins $CH_2=CHR$, in which R is hydrogen or a hydrocarbyl radical with 1–12 carbon atoms, carried out in the presence of a catalyst comprising the product of the reaction between:
(i) the solid catalyst component according to claim 1;
(ii) an alkylaluminum compound and,
(iii) optionally an external donor compound.

* * * * *